United States Patent [19]
Liu

[11] Patent Number: 5,643,982
[45] Date of Patent: Jul. 1, 1997

[54] NON-OZONE DEPLETING CO-SOLVENT COMPOSITIONS

[75] Inventor: Ju-Chao Liu, West Hartford, Conn.

[73] Assignee: Loctite Corporation, Hartford, Conn.

[21] Appl. No.: 322,937

[22] Filed: Oct. 13, 1994

[51] Int. Cl.$^6$ ..................................................... C08K 5/54
[52] U.S. Cl. ........................... 524/267; 524/319; 524/251; 524/252; 524/257; 524/247
[58] Field of Search ..................................... 524/267, 257, 524/252, 247

[56] References Cited

U.S. PATENT DOCUMENTS

| | | | |
|---|---|---|---|
| 2,784,127 | 3/1957 | Joyner et al. | 154/43 |
| 3,260,637 | 7/1966 | von Bramer | 156/314 |
| 3,427,336 | 2/1969 | Tiers | 556/437 |
| 3,836,377 | 9/1974 | Delahunty | 106/284 |
| 3,884,875 | 5/1975 | Kim et al. | 260/46.5 E |
| 4,139,693 | 2/1979 | Schoenberg | 526/297 |
| 4,200,549 | 4/1980 | Okamura et al. | 252/182 |
| 4,377,490 | 3/1983 | Shiraishi et al. | 252/188.3 R |
| 4,450,265 | 5/1984 | Harris | 526/298 |
| 4,460,759 | 7/1984 | Robins | 526/298 |
| 4,496,685 | 1/1985 | Nagasawa et al. | 524/708 |
| 4,822,426 | 4/1989 | Ito et al. | 106/189 |
| 4,869,772 | 9/1989 | McDonnell et al. | 156/314 |
| 4,933,234 | 6/1990 | Kobe et al. | 428/336 |
| 4,979,993 | 12/1990 | Okamoto et al. | 106/287 |
| 5,066,743 | 11/1991 | Okamoto et al. | 526/215 |
| 5,079,098 | 1/1992 | Liu | 428/522 |
| 5,314,562 | 5/1994 | McDonnell et al. | 156/314 |
| 5,454,970 | 10/1995 | Flaningam et al. | |

FOREIGN PATENT DOCUMENTS

| | | |
|---|---|---|
| 0220555 | 10/1986 | European Pat. Off. . |
| 0271675 | 10/1987 | European Pat. Off. . |
| 0295930 B1 | 6/1988 | European Pat. Off. . |
| 33-164 | 7/1973 | Japan . |
| 33-162 | 10/1982 | Japan . |
| 6-122898 | 5/1994 | Japan . |

*Primary Examiner*—Jeffrey T. Smith
*Attorney, Agent, or Firm*—Hoffmann & Baron

[57] ABSTRACT

A non-ozone depleting, non-flammable co-solvent composition useful as a carrier for actives such as accelerators, catalysts, initiators, activators and other primer materials for use as adhesive promoter compositions in combination with adhesive compositions. The co-solvent compositions include an azeotropic solution of a perfluorocarbon and an alkylsiloxane.

21 Claims, No Drawings

NON-OZONE DEPLETING CO-SOLVENT COMPOSITIONS

FIELD OF THE INVENTION

This invention relates to a non-ozone depleting, non-flammable co-solvent composition useful as a carrier for actives such as accelerators, activators, catalysts or other primer materials for use in combination with adhesive compositions. More particularly, the present invention relates to a co-solvent composition comprising a solution of a perfluoro compound and an alkylsiloxane.

BACKGROUND OF THE INVENTION

Chlorinated hydrocarbons such as 1,1,1-trichloroethane, other chlorinated solvents and chlorfluoro hydrocarbons (CFC's), such as $C_2F_3Cl_3$, also known commercially under the trademark FREON®, have been used for many years as solvents in numerous applications. These materials have shown to be very useful in the preparation of and as carriers for primer, activator, catalyst and accelerator compositions used in the adhesive field. These accelerators compositions often contain compounds, such as amine-bearing compounds, which require a solvent carrier for proper transport to and penetration of the substrate surface. Additionally, solvents are used to dilute the pure active compound to a useful concentration, usually on the order of about 0.01 to about 2% by weight.

In recent years, the use of chlorinated hydrocarbons, other chlorinated solvents and CFC's has been substantially lessened due to their deleterious effect on the environment. Regulations have been promulgated not only in the United States but in countries throughout the world to accelerate the phase-out of environmentally destructive solvents, and in particular those which are believed to be ozone-depleting substances. In addition to laws designed to prevent the use of these substances, product labelling requirements have also been promulgated to insure notice is given as to those compounds used as alternatives. Finding acceptable alternatives, however, has been an extremely difficult task. For example, in applications such as adhesive accelerator compositions, the solvent must possess high chemical stability, non-flammability, low toxicity, and have a low volatile organic solvent (VOC) content, yet be sufficiently volatile to readily evaporate once applied, depositing the active ingredient, e.g. an amine accelerator, on a substrate. In addition to these requirements, consideration must be given to cost factors which are important for commercial feasibility.

Attempts to find good solvent systems which balance non-ozone depleting and non-flammable characteristics with sufficient volatility to be useful in adhesive applications, have not been entirely successful. Although many materials possess the ability to act as volatile solvents, most have been too flammable or toxic to serve as suitable replacements for conventional ozone-depleting compounds, i.e. chlorinated hydrocarbons or CFC's. For example, materials such as heptane, acetone, methylethyl ketone, isopropanol, and methanol are excellent solvent systems, with good volatility, i.e. low flash point temperatures and high vapor pressures, but are extremely flammable. Other substances such as isoparaffins, and propylene glycol ether are less flammable, but do not exhibit adequate solvent performance properties for use in primer or accelerator compositions for adhesive systems.

One particular class of non-ozone depleting substances, which have been used in non-aqueous cleaning applications, are perfluorocarbons (PFC's). These materials are essentially non-toxic, non-flammable and thermally and hydrolitically stable alternatives to CFC's. In fact, the U.S. Environmental Protection Agency (EPA) has exempted PFC's from their VOC list, which indicates that they are non-ozone depleting and essentially non-reactive and non-polluting in the vapor phase. PFC's do, however, have the drawback of having low solvency for polar materials and most hydrocarbons. Thus, perfluorocarbons would not in themselves be expected to be useful as carriers for materials which require a solvent carrier, such as adhesion promoter compositions.

It is apparent, therefore, that a need exists for a solvent system which can carry actives, such as accelerator, activator, initiator, catalyst or primer compounds for adhesives, and which possess the following characteristics: non-ozone depleting, non-flammable, little or no VOC yet sufficient volatility for use as a carrier for active ingredients, low in toxicity and affordable in cost. The present invention is directed to overcoming the solvency deficiencies of perfluorocarbons, as well as addressing the aforementioned requirements for a useful alternative to CFC's.

SUMMARY OF THE INVENTION

The present invention is directed to non-ozone depleting and non-flammable solvent composition which include a solution of a perfluorocarbon and an alkylsiloxane. The perfluorocarbon may be selected from the group consisting of perfluoromethylmorpholine, perfluoroalkanes having from 5 to 8 carbon atoms, and mixtures thereof. The alkylsiloxane may be selected from the group of compounds having the formula:

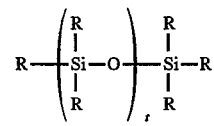

where R is an alkyl group having from 1 to 10 carbon atoms and t is an integer from 1 to 5.

It has been discovered that the aforementioned alkylsiloxanes when combined with a perfluorocarbon unexpectedly results in a co-solvent composition which has the above-desired characteristics necessary to serve as replacements for CFC's in adhesive promoter compositions. For purposes of the present invention, the term "promoter" will be used to include accelerator, activator, initiator, catalyst or adhesion enhancing compounds, as well as other compounds used for initiating, accelerating or otherwise enhancing the polymerization of adhesive compositions.

The inventive co-solvent compositions are non-ozone depleting, non-flammable solvent systems which serve as excellent carriers for the aforementioned promoter components. Thus, for example, an amine accelerator for cyanoacrylate adhesives, may be added to the co-solvent composition to form an accelerator composition. Other promoter compositions for various adhesive systems, such as anaerobic adhesives, olefinic adhesives, epoxy adhesives, and acrylic adhesives, among others, may be formed from the present co-solvent compositions. Such promoter compositions are formed by adding the promoter component to the co-solvent composition in an appropriate amount such that when applied to a substrate surface, sufficient promoter component will be deposited to serve its intended function. The co-solvent compositions of the present invention are azeotropic which correlates with their non-flammable volatility.

The amount of alkylsiloxane present in the co-solvent composition may vary and is only limited at the lower end by amounts which will no longer effectively dissolve actives and at the higher end by flammability and combustiblilty concerns. In general, the co-solvent compositions include the perfluorocarbon in amounts of about 80% to about 99.99% by weight, preferably about 90 % to 98% of the composition, and most preferably about 92% to about 95%. The alkylsiloxane may be present in amounts of about 0.01% to about 20% by weight, and preferably about 2% to about 10% and most preferably, about 5% to about 8% of the co-solvent composition.

These co-solvent solutions can be used as carriers or hosts for a variety of active ingredients and guest materials which are dispersible or dissolvable therein. In preferred applications, the active material is an accelerator compound, such as an amine-containing compound, useful for accelerating the cure speed of adhesive compositions, and in particular, cyanoacrylate adhesives. In addition to such an accelerator compound, other materials can be incorporated into the co-solvent such as stabilizers, viscosity modifiers, odor masking agents, coloring agents, plasticizers and the like, and mixtures of these materials.

In a further aspect, the present invention includes a method of preparing an adhesive promoter composition, which includes the steps of forming a co-solvent composition of a perfluorocarbon which is liquid at room temperature and adding to said co-solvent composition a material which promotes the cure and/or enhancing the adhesion of an adhesive.

The present invention further provides a method of bonding a non-polar substrate to another substrate, which may be polar or non-polar, which method comprises treating the non-polar substrate with an adhesive promoter composition which includes a co-solvent composition comprising a perfluorocarbon, an alkylsiloxane and an adhesive promoter component.

DETAILED DESCRIPTION AND PREFERRED EMBODIMENTS

The non-ozone depleting and non-flammable co-solvent compositions of the present invention include a solution of a perfluorocarbon and an alkylsiloxane. In a typical perfluorocarbon compound, fluorine atoms replace all of the carbon-bound hydrogen atoms on the hydrocarbon parent molecule. The strength of the carbon-fluorine bond allows for a high degree of thermal and chemical stability, resulting in low toxicity and low solvency for polar molecules and most hydrocarbons. For a discussion of these properties, see Grenfell, et al., "Performance Fluids For Critical Cleaning and Drying Applications", presented at the National Electronic Packaging and Production Conference. Thus, while their poor solvency for polar molecules and hydrocarbons makes them good choices for use on plastics, they have not been useful as solvents or for adhesive promoter compounds. In fact, due to their inertness, few compounds have been known to dissolve in them. However, it has been discovered that the addition of the alkylsiloxane compounds disclosed herein to the perfluorocarbon greatly improves perfluorocarbon solubility, and results in a newly formed co-solvent composition. This composition can then be used as a carrier for a variety of active ingredients or guest materials. As previously mentioned, perfluorinated compounds have been found to be useful as cleaning fluids for fluorinated greases. Grenfell, et al. attributes this usefulness to the increase in perfluorocarbon solvency capability when azeotropic combinations are formed with specific hydrocarbons. For example, Grenfell, et al. discloses azeotropic mixtures of perfluoro-N-ethyl morpholine (90%) and 2,2,4 trimethylpentane (10%); and azeotropic mixtures of $C_6F_{14}$ (90%) and t-amylmethyether. These mixtures were found to have improved solvency and subsequently improved cleaning ability. These hydrocarbons, however, would not be useful in the present invention due to their flammability and incompatibility with various substrates. Furthermore, Grenfell, et al. also specifically teaches the solubility of silicone in CFC's as being very low.

Contrary to the teaching of the Grenfell, et al. article, it has been surprisingly discovered that certain alkylsiloxanes can be combined with CFC's to form azeotropic solutions which are useful as co-solvent carrier compositions for adhesive promoter components. These combinations due to their azeotropic characteristics, have substantially identical vapor and liquid state makeup at their boiling points, thereby acting as a simple substance. The formation of an azeotrope is important to the low flash-point and non-flammability properties necessary for commercial acceptability. For purposes of the present invention the term "non-flammable" will mean a flash-point of greater than about 200° F. (94° C.), whereby heating is required for the material to catch fire; and the term "flammable" will mean the material is ignitable with a spark rather than by heating, and having a flash point of less than about 100° F. (38° C.). Those compounds which have a flashpoint between 140°–200° F. are classified as combustible. These definitions are believed to be in accordance with those set by the U.S. Department of Transportation (DOT).

As previously mentioned, the components of the present invention are non-flammable and non-combustible within the definition given above. This is in contrast to other materials, such as isoparafins or propylene glycol ether, which have been proposed as CFC replacements. These conventional solvent materials, while possessing good solvency and volatility properties, are combustible at temperatures below about 200° F. (94° C.). Other materials which exhibit excellent solvency properties, such as heptane, acetone, methylethyl ketone, methanol, propanol and the like, are highly flammable, requiring only a spark for ignition.

Thus, the present invention balances the properties of good solvency, non-flammability and non-combustibility, without being ozone-depleting. The co-solvent compositions of the present invention can serve as carriers for a variety of materials. Additionally, the present compositions are sufficiently volatile to serve as excellent carriers or solvents for adhesive promoter compositions, and in particular, amine-containing accelerator compositions. This is due to their ability to dissolve basic compounds such as amines and the like, deposit them onto a substrate surface, and quickly evaporate or flash-off, leaving behind the promoter compounds for reaction with a subsequently applied adhesive composition. The azeotropic vapor composition is non-flammable, non-combustible, non-ozone depleting, and non-toxic.

The particular promoter component used will depend for the most part on the adhesive composition to be employed as well as the type of substrate to be bonded. For example, cyanoacrylates, anaerobics, acrylics, epoxies and olefins each have classes of compounds which activate, accelerate or otherwise promote their cure and/or enhance adhesion.

The co-solvent compositions of the present invention have been found to be particularly useful with accelerator compounds for cyanoacrylate adhesive compositions.

Cyanoacrylate adhesives are rapid setting materials which have excellent utility in bonding a variety of materials. The polymerization of cyanoacrylate adhesives is catalyzed using basic, i.e., anionic compounds, such as hydroxyl- or amine-containing compounds. In the present invention, the adhesive promoter may be selected from a wide variety of compounds capable of catalyzing or initiating the polymerization or enhancing the affinity for a substrate process. For example, among those compounds to be included are:

a) organic or inorganic substituted and unsubstituted amines such as primary, secondary and tertiary amines and their salts;

b) N-substituted alkanoamines;

c) acylated N-substituted alkanoamines;

d) polyamines, such as diamines;

e) heterocyclic amines such as the diazabicyclo or triazabicyclo compounds disclosed in U.S. Pat. No. 4,869,772;

f) tertiary ammonium carboxylate compounds disclosed in U.S. Pat. No. 5,066,743 and having the formula:

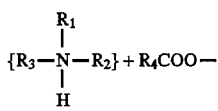

wherein $R_1$, $R_2$, $R_3$ and $R_4$ may each vary independently of each other and may be selected from the group consisting of alkyl, alkenyl, alkynyl, alkylaryl and arylalkyl, and preferably wherein at least one of $R_1$, $R_2$ and $R_3$ is a long chain alkyl moiety having 6–20 carbon atoms and $R_4$ is selected from the group consisting of alkyl and alkenyl;

g) phosphazene compounds including ring or chain polymers containing alternating phosphorus and nitrogen atoms, such as disclosed in U.S. Pat. No. 4,496,685;

h) ethylenediamine compounds such as those disclosed in U.S. Pat. No. 5,314,562 and having the formula:

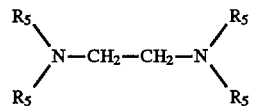

wherein each $R_5$, which may be the same or different, represents hydrogen, an alkyl, alkenyl or alkoxy group having 1 to 8 carbon atoms, an aryl group having 6 to 8 carbon atoms, a nitrogen-, silicon- or silicon-substituted Group having 1 to 8 carbon atoms or a heterocyclic group having up to 8 carbon atoms which may be unsubstituted or substituted with hydroxy, ether oxygen or sulphur.

i) quaternary ammonium compounds useful as primers for improving the adhesion, as disclosed in U.S. Pat. No. 5,079,098, having the formula:

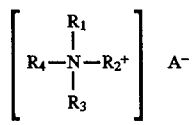

wherein $R_1$, $R_2$, $R_3$ and $R_4$ may each vary independently of the others and are selected from the group consisting of alkyl, hydroxyalkyl, aryl, alkaryl, aralkyl and alkenyl, optionally substituted with heteroatoms; and A– is an anion whose $pK_a$ value in deprotonation equilibrium reaction is greater than about 0.

The above-mentioned U.S. Pat. Nos. 4,869,772, 5,066,743, 5,079,098, 4,496,686 and 5,314,562 are herein incorporated by reference.

Other useful amines include those disclosed in U.S. Pat. No. 3,260,637, used as accelerators for cyanoacrylates.

Among the preferred class of amines are the acylated N-substituted alkanoamines such as dimethyl para-toluidine (DMPT). DMPT has been found to be particularly useful in the present invention to form an activator composition for cyanoacrylate adhesive compositions, and the like.

The co-solvent compositions of the present invention can be used with a variety of adhesive systems and are compatible with metallic and non-metallic surfaces. Adhesive promoter systems formed from the co-solvent compositions can be used on numerous types of bonding surfaces, such as steel, plastic, glass and wood. The co-solvent carrier compositions of the present invention provide a more environmentally friendly alternative to conventional solvents and, due to their inertness are compatible with, i.e. do not attack, most engineering plastics. In addition to being non-ozone depleting and non-flammable, the co-solvent carrier compositions of the present invention are low in toxicity, fast drying, i.e. quick evaporating, and can be commercially produced in a cost effective manner.

As previously mentioned, the present co-solvent compositions are formed by co-dissolving at least one perfluorocarbon from the group consisting of perfluoromethylmorpholine, perfluoroalkanes having from 5 to 8 carbon atoms and mixtures thereof, with one or more alkylsiloxanes having the chemical formula:

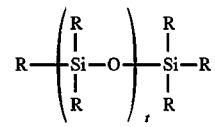

where R is an alkyl group having 1 to 10 carbon atoms and t is an integer from 1 to 5. The perfluorocarbon should be a liquid at room temperature to allow the co-solution with the alkysiloxane to be formed without heating or other additional steps.

In one preferred embodiment of the invention, the co-solvent composition includes a combination of: i) a perfluorocarbon having the empirical formulas $C_5F_{11}NO$ and/or $C_nF_{2n+2}$, where n is an integer from 5 to 8, and ii) an alkylsiloxane. The alkylsiloxane is preferably hexamethyldisiloxane or octamethyltrisiloxane. The perfluorocarbon may be present in amounts of about 80 to about 99.0% by weight, preferably about 90 to about 98% and most preferably, about 92 to about 95% by weight. As previously mentioned, the amount of alkylsiloxane present in the co-solvent carrier composition is determined by such factors as solvency, combustibility, and flammability. In general, the alkysiloxane may be present in amounts of about 0.01 to about 20% by weight, preferably about 2 to about 10% by weight, and most preferably about 5 to about 8% by weight. In general, the co-solvent composition is prepared by co-dissolving, for example, about 0.01 to about 20% by weight alkylsiloxane, i.e., hexamethyldisiloxane or octamethyltrisiloxane, in the perfluorocarbon.

Another embodiment of the invention discloses a non-ozone depleting, non-flammable delivery system wherein the co-solvent serves as a carrier for actives or guest materials which are dispersible or dissolvable therein to form a homogeneous mixture or solution. In preferred applications, the guest material is an amine-containing compound, useful for accelerating the cure speed for adhesive compositions.

Other conventional additives useful in adhesive promoter compositions may be incorporated into the co-solvent compositions. These include, without limitation, stabilizers, viscosity modifiers, odor masking agents, coloring agents, plasticizers, and mixtures thereof.

The co-solvent compositions of the present invention may be formed into adhesive promoter compositions by the addition of an adhesive promoter component. In such a case, the adhesive promoter composition would include the co-solvent composition, and an active such as an adhesive promoter component. The present invention, when combined with an adhesive promoter component and employed as an adhesive promoter composition is intended to be applied to the surface of a metallic or non-metallic surface to be bonded, followed by application of the adhesive thereover, and finally, pressing together of the surfaces. These compositions are generally termed primer compositions. Such compositions are most effective when the surface free-energy of the solvent is close to that of the substrate surface to be adhesively bonded.

The concentration of the promoter component in a particular adhesive promoter composition may be determined by the type of adhesive, particular substrate surface, the promoter selected and the desired function or result. Generally, the promoter component is present in the adhesive promoter composition in amounts which are effective to produce the required cure speed and tensile strength. For example, amounts of from about 0.01% to about 10% by weight of the adhesive promoter composition are useful, with preferred amounts being about 0.05 to about 2%, and most preferably, about 0.25 to about 0.60% by weight. It is preferred to apply the adhesive promoter composition at the lowest effective concentration to decrease cost and increase ease of application, as well as allow the accelerator to be close to the thickness of a monomolecular layer. Typically, one application of the adhesive promoter on one side of the substrate is sufficient, although in certain instances it may be advantageous to coat both substrates. Multiple coatings may be applied where larger bond gaps and thicker adhesive layers are used.

The adhesive promoter composition comprising the co-solvent composition and the promoter component may be applied to the substrate surface to be bonded with the cyanoacrylate, or other adhesive, in any manner that is satisfactory to effect the desired result, e.g., to initiate or accelerate cure or enhance substrate adhesion. For example, spraying, dipping, brushing, swabbing, wiping, roller coating, etc. of the adhesion promoter composition onto one or more of the substrate surfaces prior to application of the adhesive, is preferred.

The thickness of the adhesive promoter composition and adhesive layer may vary widely, depending on the character and composition of the substrate surfaces, the particular adhesive and accelerator to be employed, as well as the end use of the final bonded assembly. With any given set of parameters, acceptable and optimum thicknesses may be determined by lapshear tensile shear strength values for particular samples at various primer and adhesive layer thicknesses. The adhesive layer of about "0" to about 5 mils and as great as about 10 mils have been found to be generally satisfactory for many substrates.

The co-solvent compositions of the present invention can be safely applied to a large variety of polymeric substrates, including thermosets and thermoplastics. Examples of thermoplastic materials include, without limitation, polycarbonate (PC), polyphenylene ether alloy, polyphenylene sulfide, polyphenylene oxide, nylon, melamine, polyacetal, polycarbonate, polyesters such as polybutyleneterephthalate (PBT) and polyethyleneterephthalate (PET), acrylic, acrylonitrile butadiene styrene (ABS), cellulose acetate, ethylene vinyl acetate (EVA), ionomer, polyaryl ether, and polyolefins such as polyethlene, polypropylene, polybutylene and polyallomer, polymethylpentane, polystyrene, polysulfone, polyvinyl chloride (PVC), styrene acrylonitrile (SAN), and styrene butadiene; thermosets such as epoxides and phenolics, among others, are also useful. Composites, such as epoxy glass substrates, may also be used in conjunction with the inventive adhesion promoter and co-solvent compositions. The co-solvent compositions of the present invention do not attack or demonstrate any visible deleterious effect on the foregoing substrates.

Other substrates, such as wood, metal, rubber, leather, cloth, paper or ceramics, are of course contemplated, since the co-solvent compositions of the present invention may be customized for a particular application by incorporation of the desired accelerator component.

As previously mentioned, the co-solvent compositions of the present invention are especially useful as carriers for cyanoacrylate adhesive promoter compositions, particularly for enhanced adhesion. Suitable cyanoacrylate adhesives are represented by the general formula:

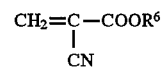

$$CH_2=C-COOR^6$$
$$|$$
$$CN$$

wherein $R^6$ is alkyl, alkenyl, cycloalkyl, aryl, alkoxalkyl, aralkyl, haloalkyl or other suitable group. The lower alkyl alpha-cyanoacrylates are preferred. In particular, these include methyl, ethyl, n-propyl, n-butyl, isobutyl, isopropyl, allyl, cyclohexyl, methoxyethyl, methoxypropyl, cyclohexyl, n-pentyl, allyl, and ethoxyethyl cyanoacrylates.

If a structural or engineering adhesive is to be employed, such as an anaerobic, the co-solvent composition can contain an anaerobic accelerating component which interacts with an initiator present in the adhesive composition to speed the cure. Tertiary alkyl amines, rhodamine and organic hydrazides, alkoxy amines, as well as ferrocene compounds are conventionally used as anaerobic accelerators.

Acrylic adhesives are typically two part systems; the first part containing the monomer and initiator component; and the second part containing the accelerator or curative component, which in the context of the present invention would be carried in the co-solvent composition. Other two part systems, such as epoxy systems, may also employ the co-solvent compositions of the present invention for carrying the curing agent, e.g. emines, anhydrides and the like.

The features and advantages of the present invention will be more clearly understood by reference to the following examples, which are illustrative of certain preferred embodiments but are not to be construed as limiting the scope of invention.

EXAMPLES

Example One

The following co-solvent compositions of the present invention were prepared by co-dissolving the perfluorocarbon and the alkylsiloxane using simple mixing procedures at room temperature.

TABLE 1

| | Co-Solvent Compositions % weight | | | |
|---|---|---|---|---|
| | A | B | C | D |
| Perfluorocarbon | | | | |
| $C_5F_{11}NO$ | 92 | 95 | 85 | 74 |
| Alkylsiloxane | | | | |
| Octamethyltrisiloxane | 8 | 5 | — | — |
| Hexamethyldisiloxane | — | — | 15 | 26 |

The co-solvent compositions of Table 1 were subjected to distillation followed by GC analysis and determined to be azeotropic.

The following inventive adhesive promoter compositions were prepared as shown in Table 2:

TABLE 2

| ADHESIVE PROMOTER COMPOSITIONS (% weight) | | | | | |
|---|---|---|---|---|---|
| | Composition | | | | |
| Component | 1 | 2 | 3 | 4 | 5 |
| $C_5F_{11}NO$ | 93.4 | 93.4 | 93.4 | 95.6 | 95.6 |
| HMDS* | 6.0 | 6.0 | 6.0 | — | — |
| OMTS** | — | — | — | 4.0 | 4.0 |
| DMPT*** | 0.6 | 0.6 | 0.6 | 0.4 | 0.4 |
| | 100 | 100 | 100 | 100 | 100 |

*Hexamethyldisiloxane
**Octamethyltrisiloxane
***Dimethyl para-toluidine

Various tests were conducted on the inventive promoter compositions prepared in accordance with the present invention. These tests included aging (stability) as measured by fixture time performance, bond strength, (tensile) as a function of cure time, fixture time using different application methods, as well as cure speed as compared to conventional solvent based (CFC-containing) adhesive promoters. The results of these tests are tabulated and discussed below.

TABLE 3

| FIXTURE TIMES AGING (ROOM TEMPERATURE) STABILITY | | | | |
|---|---|---|---|---|
| Composition | Initial | 3 Months | 7 Months | 8 Months |
| 1 | <5 secs. | <5 secs. | <5 secs. | <5 secs. |
| 4 | <5 secs. | <5 secs. | <5 secs. | <5 secs. |

As indicated from Table 3, the fixture times for inventive compositions 1 and 4 remain under 5 seconds after aging for up to 8 months. This indicates the adhesive promoter compositions of the present inventive are stable after aging at room temperature, as evidenced by their ability to maintain accelerating activity to achieve rapid fixture times. These tests were performed on grit blasted steel lapshears. The lapshears were coated with the adhesive promoter composition prior to application of the alpha-cyanoacrylate adhesive (LOCTITE® adhesive 410) at 0 bond gap. Fixture was determined at the point the lapshear could lift a 3 kg weight.

Inventive adhesive promoter composition 4 was tested using a variety of applicators on both epoxy glass and grit-blasted steel lapshears. Fixture times and drying times were compared to a commercially available CFC-based accelerator composition. The results, tabulated in Table 4 below, indicate comparable fixture times as compared to the commercially available CFC-based accelerator compositions. In particular, drying times using a spray applicator on grit-blasted steel lapshears is more than twice as fast as the conventional CFC-based compositions. Drying time is an important aspect of the present invention, since to be commercially competitive, the adhesive promoter compositions must carry the active component to the substrate surface and rapidly evaporate thereafter. The co-solvent compositions of the present invention demonstrate excellent drying time, as indicated in Table 4. The co-solvent carriers of the present invention also allow for sufficient open (on-part life) time to effectuate optimal bonding. Open time is the optimal amount of time the active ingredient remains effective on the surface of the substrate once the co-solvent carrier has evaporated, prior to application of the adhesive.

TABLE 4

| APPLI-CATOR | SUB-STRATE | ADHESION PROMOTER COMPOSITION 4 | CFC-BASED COMPOSITION |
|---|---|---|---|
| Fixture Time | | | |
| Brush | Epoxy Glass | 20–25 sec. | 10 sec. |
| Brush | G.B. Steel | 10 sec. | 5–8 sec. |
| Spray | Epoxy Glass | <2 sec. | <2 sec. |
| Spray | Steel | >2 sec.<5 sec. | >2 sec.<5 sec. |
| Drying Time | | | |
| Brush | G.B. Steel | 15 sec. | <5 sec. |
| Spray | G.B. Steel | 30 sec. | >1 min. |

The bond strengths of adhesive promoter (accelerator) compositions of the present invention were tested at the various cure times on grit-boasted steel and epoxy glass substrates, respectively. These bond strengths were compared to conventional CFC-based accelerator compositions which are commercially available. The bond strength results (psi) are reported in Table 6 below. The adhesive used in each of the tests was an alpha-cyanoacrylate, commercially available as LOCTITE® Adhesive 416. The lapshears were respectively coated with the adhesive promoter compositions, followed by application of the cyanoacrylate adhesive and joining of the lapshears together. Cure time was measured at one, two, and twenty-four hour periods, all at room temperature.

As evidenced by the table, the bond strengths of lapshears using the inventive adhesive promoter composition on grit-blasted steel was slightly lower than the conventional promoter composition after one and two hours of cure time. However, after twenty-four hours of cure, the inventive compositions exhibited higher bond strengths than the commercially available CFC-based accelerator composition. On epoxy glass lapshears, the inventive compositions exhibited bond strengths that were higher after each of the cure intervals than the CFC-based accelerator compositions of the prior art. These results are indicative of the ability of the present invention to function well on both metallic and non-metallic surfaces, particularly when compared to commercially available ozone-depleting solvents which are conventionally used to carry the amine accelerator.

TABLE 5

TENSILE BOND STRENGTH (psi)

| SUBSTRATE | ROOM TEMPERATURE CURE TIME | INVENTIVE COMPOSITION 4 | CFC-BASED ACCELERATOR COMPOSITION |
|---|---|---|---|
| G.B. Steel | 1 hour | 1945 | 2243 |
| G.B. Steel | 2 hours | 1773 | 2475 |
| G.B. Steel | 24 hours | 2279 | 2174 |
| Epoxy Glass | 1 hour | 1437 | 1364 |
| Epoxy Glass | 2 hours | 1505 | 1375 |
| Epoxy Glass | 24 hours | 1701 | 1393 |

Additional testing to demonstrate the ability of the inventive compositions to retain its accelerating activity after aging at room temperature for various intervals were conducted. Table 6 shows the results of grit-blasted steel lapshears at intervals of fifteen minutes, one hour, two hours, and twenty-four hours room temperature curing. Lapshears were prepared by applying the respective adhesive promoter compositions to one of the lapshears to be joined, followed by application of the adhesive and mating of the lapshears together. The lapshears were then allowed to sit at room temperature for the indicated intervals and subsequently pulled apart in accordance with ASTM procedures to give the results in psi indicated in Table 6. As is clear from the table, the inventive compositions exhibit comparable tensile strengths when used to cure the adhesive as compared to the commercially available CFC-containing accelerator compositions, without ozone-depleting characteristics or other deleterious effects being present.

TABLE 6

TENSILE STRENGTH ON GRIT BLASTED STEEL (psi)

| AGING | INVENTIVE COMPOSITION 4 | CFC-BASED ACCELERATOR COMPOSITION |
|---|---|---|
| 15 min @ RT | 1996 | 1869 |
| 1 HR @ RT | 1870 | 1894 |
| 2 HRS @ RT | 2083 | 2227 |
| 24 HRS @ RT | 2467 | 2057 |

Additional testing was conducted with respect to fixture time and drying time. The results, shown in Table 7, demonstrate the ability of the compositions of the present invention to exhibit comparable fixture and drying times to those of the CFC-based prior art compositions.

TABLE 7

| TEST | APPLICATOR | SUBSTRATE | INVENTIVE COMPOSITION 1 | CFC-BASED ACCELERATOR COMPOSITION |
|---|---|---|---|---|
| FIXTURE TIME | BRUSH | EPOXY | <5 sec. | <5 sec. |
| | | GBM STEEL | <5 sec. | <5 sec. |
| | SPRAY | EPOXY | <5 sec. | <5 sec. |
| | | GBM STEEL | <5 sec. | <5 sec. |
| DRYING TIME | BRUSH | GBM STEEL | <5 sec. | <5 sec. |
| | SPRAY | GBM STEEL | <5 sec. | <5 sec. |

Table 8 below lists a variety of plastic substrates on which the inventive adhesive promoter compositions containing an amine accelerator component was applied. The purpose of this test was to determine whether the co-solvent compositions used as an adhesive promoter in any way deleteriously affected the plastic substrates. In all cases tested, the inventive compositions exhibited no visible deleterious effect on the plastic. This is distinct from the results obtained from the conventional CFC-based compositions, which showed a variety of effects, including clouding, etching or crazing on certain substrates. The results, shown in Table 8 indicate an "X" where the accelerator has had no visible effect on the plastic, and an "O" where the accelerator had a visible effect on the plastic.

TABLE 8

| PLASTIC SUBSTRATE | INVENTIVE ACCELERATOR COMPOSITION 1 | CFC-BASED ACCELERATOR COMPOSITION |
|---|---|---|
| Polycarbonate (PC) | x | o |
| Prevex* (polyphenylene ether alloy) | x | x |
| Supec* (polyphenylene sulfide) | x | x |
| Noryl* (styrene modified polyphenylene oxide) | x | x |
| Ultem | x | x |
| Nylon | x | x |
| Melamine | x | x |
| Delrin* (polyacetal) | x | x |
| Xenoy* | x | o |
| Polycarbonate/polybutylneterephthalate (PC/PBT) | | |
| Valox* (PBT) | x | x |
| Acrylic | x | x |
| Acrylonitrile Butadiene Styrene | x | x |

TABLE 8-continued

| PLASTIC SUBSTRATE | INVENTIVE ACCELERATOR COMPOSITION 1 | CFC-BASED ACCELERATOR COMPOSITION |
|---|---|---|
| Cellulose Acetate | x | x |
| Ethylene Vinyl Acetate | x | x |
| Ionomer | x | x |
| Polyallomer | x | x |
| Polyaryl Ether | x | o |
| Polybutylene | x | x |
| Polymethylpentene | x | x |
| Polystyrene | x | x |
| Polysulfone | x | x |
| Polyvinly Chloride (PVC) | x | x |
| Styrene Acrylonitrile (SAN) | x | x |
| Styrene Butadiene | x | o |
| Thermoplastic Polyester** (PETG) | x | o |
| Urethane Elastomer (polyester) | x | x | x - indicates the accelerator had no visible deleterious effect on plastic
o - indicates the accelerator had a visible deleterious effect on plastic, with clouding, etching, or crazing
*Trademarks
**Polyethyleneterepthalate (glycol modified)

The invention being thus described, it will be obvious may be varied in many ways. Such variations are not to be regarded as a departure from the spirit and scope of the invention, and all such modifications are intended to be included within the scope of the following claims.

What is claimed is:

1. A non-ozone depleting and non-flammable azeotropic co-solvent carrier composition comprising a perfluorocarbon and an alkylsiloxane present in an amount of up to about 26% by weight.

2. The composition of claim 1 wherein the perfluorocarbon is selected from the group consisting of perfluoromethylmorpholine, perfluoroalkanes having from 5 to 8 carbon atoms and mixtures thereof.

3. The composition of claim 1 wherein the alkysiloxane is selected from the group of compounds having the formula

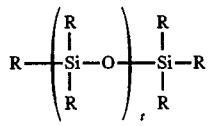

wherein R is an alkyl group having from 1 to 10 carbon atoms and t is an integer from 1 to 5, and mixtures thereof.

4. The composition of claim 1 wherein the perfluorocarbon has the empirical formula $C_5F_{11}NO$ or $C_nF_{2n+2}$ where n is 5 to 8, and the alkylsiloxane is hexamethyldisiloxane or octamethyltrisiloxane.

5. The composition of claim 1 wherein the alkylsiloxane is present in amounts of about 0.01% to about 20% by weight.

6. A method of forming a non-flammable, non-ozone depleting adhesive promotor carrier composition comprising:
   (i) providing a non-ozone depleting perfluorocarbon compound;
   (ii) adding to said perfluorocarbon compound an alkylsiloxane compound present in an amount of up to about 26% by weight and having the formula:

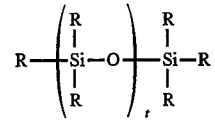

wherein R is an alkyl group having from 1 to 10 carbon atoms, t is an integer from about 1 to 5, and whereby an azeotropic co-solvent solution is formed.

7. The method of claim 6 wherein the perfluorocarbon compound has the formula $C_nF_{2n+2}$, wherein n is from 5 to 8.

8. A non-ozone depleting, non-flammable adhesive promoter composition comprising:
   (i) a carrier solution comprising a co-solvent solution of perfluorocarbon and an alkylsiloxane; and
   (ii) an adhesive promoter selected from the group consisting of accelerators, activators, initiators, catalysts and mixtures thereof, said adhesive promoter being dispersible or dissolvable in said carrier solution.

9. The composition of claim 8 wherein the perfluorocarbon compound and the alkylsiloxane form an azeotrope.

10. The composition of claim 8 wherein the amount of alkylsiloxane is about 0.01% to about 20% by weight.

11. The composition of claim 8 wherein the active material is an amine-containing compound.

12. The composition of claim 11 wherein the amine-containing compound is selected from the group consisting of dimethyl para toluidine, triethylamine, tributylamine, aniline, benzylamine, triethylenetetramine, hydroxyethyldimethylamine and mixtures thereof.

13. An adhesive accelerator composition comprising:
   (i) a co-solvent solution of a perfluorocarbon compound and an alkylsiloxane; and
   (ii) an accelerator for speeding the cure of an adhesive composition.

14. The composition of claim 13 wherein said accelerator is an amine-containing compound.

15. The composition of claim 14 wherein said amine-containing compound is selected from the group consisting of dimethylparatoluidine, N,N-diethyl-p-toluidine, triethylamine, tributylamine, aniline, benzylamine, triethylenetetramine, hydroxyethyldimethylamine, methylene-bis-4,4'-(N,N-dimethyl-o-toluidine) and mixtures thereof.

16. The composition of claim 13 wherein the amine-containing compound is present in amounts of from about 0.01% to about 10% by weight.

17. The composition of claim 13 wherein the perfluorocarbon compound has the formula $C_nF_{2n+2}$ wherein n is 5 to 8, and the alkylsiloxane compound has the formula

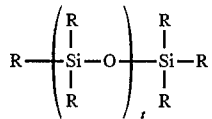

wherein R is an alkyl group having from 1 to 10 carbon atoms and t is an integer from 1 to 5.

18. The composition of claim 13 wherein the alkysiloxane is present in amounts of about 0.01 to about 20% by weight.

19. The composition of claim 18 wherein said amine accelerator is present in amounts of from about 0.01 to about 2.0% by weight.

20. The composition of claim 19 wherein said amine accelerator is selected from the group consisting diamethylparatoluidine, triethylamine, tributylamine, aniline, benzylamine, triethylentetramine, hydroxyethyldimethylamine and mixtures thereof.

21. The accelerator composition of claim 20 wherein there is additionally incorporated an additive selected from the group consisting of stabilizers, viscosity modifiers, odor masking agents, coloring agents, plasticizers and mixtures thereof.

* * * * *

UNITED STATES PATENT AND TRADEMARK OFFICE
CERTIFICATE OF CORRECTION

PATENT NO. : 5,643,982
DATED : July 1, 1997
INVENTOR(S) : Liu, Ju-Chao

It is certified that error appears in the above-identified patent and that said Letters Patent is hereby corrected as shown below:

Column 12, Table 8, Line 4    now reads "x", should read -- o--;

Colum 12, Table 8, Line 10,    now reads "Polycarbonate/polybutylneterephthalate", should read -- Polycarbonate/polybuthyleneterephthalate --.

Signed and Sealed this

Twenty-fifth Day of November, 1997

Attest:

BRUCE LEHMAN

*Attesting Officer*    *Commissioner of Patents and Trademarks*